United States Patent [19]

Okada et al.

[11] Patent Number: 4,526,656
[45] Date of Patent: Jul. 2, 1985

[54] MONOMERIC VINYL CHLORIDE STRIPPING TOWER

[75] Inventors: Hiroshi Okada, Nagoya; Hideyuki Itagaki, Tokai; Takehiko Kano; Seiichi Masuko, both of Takaishi, all of Japan

[73] Assignee: Mitsui Toatsu Chemicals, Incorporated, Tokyo, Japan

[21] Appl. No.: 536,388

[22] Filed: Sep. 27, 1983

[30] Foreign Application Priority Data

Sep. 27, 1982 [JP] Japan .............................. 57-166655

[51] Int. Cl.³ .............................................. B01D 3/14
[52] U.S. Cl. ................................... 202/158; 202/264; 261/DIG. 26
[58] Field of Search .................. 203/20; 202/264, 158, 202/161; 159/DIG. 4; 261/DIG. 26

[56] References Cited

U.S. PATENT DOCUMENTS

| | | | |
|---|---|---|---|
| 3,456,428 | 7/1969 | Bichet et al. | 203/20 |
| 4,158,092 | 6/1979 | Bötsch et al. | 528/500 |
| 4,171,427 | 10/1979 | Ohorodnik et al. | 528/500 |
| 4,200,734 | 4/1980 | Muehlenbrock et al. | 528/503 |
| 4,228,273 | 10/1980 | Hughes | 528/491 |

*Primary Examiner*—Frank Sever
*Attorney, Agent, or Firm*—Fisher, Christen & Sabol

[57] ABSTRACT

Disclosed herein is a stripping tower adapted to remove unreacted vinyl chloride from a suspension or emulsion of a vinyl chloride resin after its polymerization reaction. The tower is a packed tower filled with a packing such as Tellerette packing. A condenser is provided in direct attachment to a top portion of the packed tower so that steam, which is discharged together with stripped monomeric vinyl chloride gas, is condensed in the condenser, separated from the monomeric vinyl chloride gas and then recirculated to the packed tower. Use of a packed tower as a stripping tower and steam as a stripping medium enjoys good removal efficiency of monomeric vinyl chloride but is accompanied by occurrence of a large volume of foams of a polyvinyl chloride slurry in the tower. Foams of the slurry eventually overflow from the top of the tower and do not permit any further continuation of the operation. Provision of the condenser in direct attachment to the top portion of the tower was found to be effective in suppressing the occurrence of foams, thereby permitting efficient removal of monomeric vinyl chloride.

3 Claims, 1 Drawing Figure

MONOMERIC VINYL CHLORIDE STRIPPING TOWER

BACKGROUND OF THE INVENTION (a) Field of the Invention

This invention relates to a stripping tower adapted to remove unreacted monomeric vinyl chloride (hereinafter abbreviated as "MVC") from a suspension or emulsion (hereinafter simply called "slurry" whether the liquid mixture is a suspension or emulsion) of a vinyl chloride resin (hereinafter referred to as "PVC" for the sake of brevity).

(b) Description of the Prior Art

PVC is produced from MVC alone or a combination of MVC and a monomer polymerizable with MVC in accordance with the suspension or emulsion polymerization process. After completion of the polymerization, unreacted MVC is removed and recovered by reducing the pressure of the resultant reaction mixture or blowing an inert gas into the reaction mixture and PVC is thereafter dried into a final product.

Upon effecting such removal and recovery of MVC, plate-type stripping towers are generally employed owing to their high efficiency. In a conventional plate-type stripping tower, a PVC slurry is supplied from a top portion of the tower and then brought into countercurrent contact with an inert gas or steam blown as a stripping medium from a bottom portion of the tower into the tower. MVC is thus removed from the PVC slurry and then discharged as a gaseous mixture containing steam from the top of the tower. The thus-discharged gaseous mixture is then processed further for the recovery of MVC.

The above stripping tower is of the plate type and the efficiency of MVC removal varies in accordance with the number of plates. Although the efficiency becomes better as the number of plates increases, use of more plates unavoidably leads to a larger tower because it is necessary to leave a certain distance or longer between each two adjacent plates. Furthermore, a variety of PVCs is now produced. Whenever production is changed from one type of PVC to another, it is required to wash the interior of the stripping tower. The stripping tower however contains some unaccessible areas for a washing fluid as it is of the plate type. Thus, it is difficult to wash the stripping tower thoroughly.

With the foregoing in view, the present inventors attempted to use a packed tower as a stripping tower and steam as a stripping medium. The attempt resulted in good efficiency of MVC removal. However, the interior of the tower was filled up with foams, whereby developing a problem that foams of the slurry overflew from the top of the tower. Due to this problem, it was difficult to continue the operation.

As a result, the present inventors came to a conclusion that use of a packed tower as a stripping tower assures good efficiency with respect to the removal of MVC but involves a problem of foam development. The present inventors have proceeded with a further investigation on the basis of the above finding and have finally led to completion of this invention.

SUMMARY OF THE INVENTION

The present invention thus provides a monomeric vinyl chloride stripping tower adapted to remove monomeric vinyl chloride from a suspension or emulsion of a vinyl chloride resin, characterized in that the stripping tower is a packed tower filled with a packing and a condenser is provided in direct attachment to an upper portion of the packed tower so that steam, which is discharged together with stripped monomeric vinyl chloride, is condensed in the condenser, separated from the monomeric vinyl chloride and then recirculated to the packed tower.

Provision of the condenser in direct attachment to the upper portion of the tower is effective in suppressing the occurrence of foams of a PVC slurry in the packed tower and hence assures efficient removal of MVC.

DETAILED DESCRIPTION OF THE INVENTION

Figure 1:
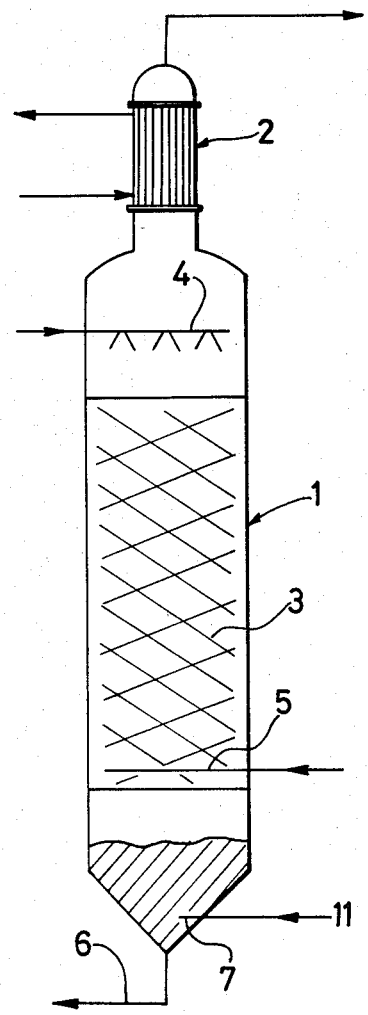
FIG. 1 is a schematic cross-sectional view showing the structure of a stripping tower according to this invention.

The present invention will hereinafter be described with reference to the accompanying drawing.

A packed tower 1 is equipped at its top portion with a condenser 2 which condenses steam, which has been discharged together with stripped MVC, so as to separate the steam as an aqueous condensate. The resultant aqueous condensate is thereafter recirculated to the packed tower 1.

Slurry feed nozzle 4 is provided in an upper spacing which lies above a packed portion (where a packing is filled) 3 in the packed tower 1 so that a PVC slurry containing unreacted MVC is charged through the nozzle 4. These slurry feed nozzle 4 is arranged in such a way that the PVC slurry may be charged uniformly relative to a plane parallel to the ground.

It is preferred to employ as the packing a packing having such a structure as discouraging sedimentation or precipitation of the PVC slurry. As exemplary packings, may be mentioned Raschig rings, Berl saddles, Tellerette packing, pall rings, Lessing rings, interlock saddles, etc. Among them, Tellerette packing is preferable. The size of each piece of the packing may vary in accordance with the size of the tower, the volume of packing to be filled, the flow rate of PVC slurry to be treated, etc.

The packing may account for 3–50% or preferably 5–20% of the internal volume of the packed tower. Any volumes less than 3% cannot exhibit the effect of the packing, whereas any volumes in excess of 50% lead to reduction in treatment capacity of the stripping tower.

At a lower location within the packed portion 3 or just below the lower extremity of the packed portion 3, a nozzle 5 is provided to flow steam into the packed tower 1. Upon operation of the packed tower 1, steam is blown normally at a pressure of 2–7 kg/cm$^2$G through the nozzle 5. The thus-blown steam ascends through the packed portion 3, where it is brought into countercurrent contact with the PVC slurry charged through the slurry feed nozzle 4 to remove MVC from the PVC slurry.

The resultant PVC slurry, from which MVC has been removed owing to the countercurrent contact with steam, is received in a bottom portion of the packed tower 1. A piping 6 is provided with the bottom of the packed tower 1 so as to draw out the thus-received PVC slurry.

The PVC slurry is not resistant to heat and PVC is decomposed and its quality is deteriorated when exposed to temperatures of about 90°-100° C. for a long time. Accordingly, it is preferred to provide a further piping 7 in the bottom portion of the packed tower 1 for introducing water or a portion of the PVC slurry, which has been drawn out of the packed tower 1 and cooled, there so that the PVC slurry is cooled. This piping 7 is not required when the packed tower 1 is operated in such a way that the temperature is always maintained in the bottom portion of the packed tower 1 at a level not inducing the decomposition of PVC and the received PVC slurry is immediately drawn out of the packed tower 1 and cooled.

On the other hand, the MVC which has been stripped in the packed tower 1 is caused to pass through the condenser 2 attached directly to the packed tower 1 so that the accompanying water is separated there. Then, the resultant MVC is fed to a MVC recovery step which is not illustrated in the drawing.

The aqueous condensate obtained in the condenser 2 is recirculated to the packed tower 1. By recirculating the aqueous condensate from the tower top as mentioned above, the PVC slurry is prevented from developing foams in the packed tower 1. It is desirous to disperse the thus-recirculated aqueous condensate throughout the entire upper portion of the packed tower 1. For this purpose, it is desirous to construct the condenser 2 into a shell-and-tube structure so that aqueous condensates formed respectively on the multiplicity of tubes are recirculated directly to the top portion of the packed tower 1.

The inner diameter of the condenser 2 may preferably be from $\frac{1}{3}$ to 1 and more preferably from 2/5 to $\frac{7}{8}$ of the inner diameter of the packed tower 1.

The stripping tower according to this invention may be operated under such conditions that the temperature and pressure are maintained respectively at 70°-100° C. or preferably 80°-95° C. and 300-760 Torr or preferably 350-650 Torr in the top portion of the packed tower 1 and the slurry is kept in a boiling state in the top portion of the packed tower 1.

It is desirous to operate the stripping tower while maintaining the intratower gas/liquid mixture as a system in which the gas is dispersed in the liquid. The suitable gas holdup is generally 0.2-0.8 $m^3/m^3$ or preferably 0.3-0.6 $m^3/m^3$. If the gas holdup should be less than 0.2 $m^3/m^3$, MVC may not be removed to any sufficient extent. On the other hand, any gas holdups greater than 0.8 $m^3/m^3$ require to increase the volume of steam to be blown into the packed tower 1 and, in some instances, may not permit normal operation of the packed tower 1.

If the temperature should exceed 100° C. in the top portion of the packed tower 1, the quality deterioration of PVC is promoted in the course of the MVC removal. On the other hand, the efficiency of the MVC removal is lowered if the temperature is lower than 70° C. in the top portion of the packed tower 1. Besides, the temperature of the bottom portion of the packed tower 1 is desirously 100° C. or lower. It is preferred from the viewpoint of the operational efficiency of the packed tower 1 to maintain the temperature difference between the bottom portion and the top portion of the packed tower 1 within 20° C.

The volume of steam to be blown into the packed tower 1 may vary depending on the temperature and pressure of the steam and operation conditions of the packed tower 1. In the case of steam of 120°-170° C. and 2-7 $kg/cm^2G$, it is suitable to charge the steam at a weight ratio of 0.02-0.2 relative to the PVC slurry.

Furthermore, the residence time of the PVC slurry may vary in accordance with the operation conditions of the packed tower 1, the concentration of MVC in the PVC slurry, the efficiency of removal of MVC, etc. It may generally be within 30 minutes.

The required height of the packed tower 1 may be calculated in accordance with an empirical equation obtained from process equilibrium, material balance and the like determined respectively by carrying out some preparatory experiments in advance. The efficiency of removal of unreacted MVC is governed by various parameters such as operation conditions of the packed tower 1 (temperature, pressure, steam volume to be charged, residence time, etc.), the concentration of each PVC slurry and, where the slurry is a suspension, the porosity of the PVC resin. The height of the packed portion 3 may be 20 m or shorter if one wants to lower the concentration of unreacted MVC present in a PVC slurry drawn out of the packed tower 1 to 0.005 times the concentration of unreacted MVC contained in a PVC slurry entering the packed tower 1. If one uses a packed tower 1 which pertains to this invention and has a 20 m high packed portion, a PVC slurry containing for example 15,000 ppm of unreacted MVC may be continuously treated to lower its MVC concentration to 75 ppm or lower.

The inner diameter, in other words, the cross-sectional area of the packed tower 1 is determined by the amount of the PVC slurry to be charged into the packed tower 1 for its treatment. Since the stripping tower according to this invention features an extremely high efficiency of removal of unreacted MVC, it is preferred to determine the inner diameter of the packed tower 1 on the basis of such a standard that the volume of a PVC slurry treatable per unit cross-sectional area of the packed tower 1 ranges from 10-100 $ml/min.cm^2$.

Since the stripping tower according to this invention assures good removal effect for unreacted MVC, a PVC slurry may be directly charged into the stripping tower without the batch-type reduced-pressure deaeration step which has heretofore been carried out. Even without the deaeration step, the concentration of MVC in the treated PVC slurry may be reduced to 100 ppm or less by slightly changing the operation conditions of the packed tower 1.

The stripping tower according to this invention is highly effective for the removal of unreacted MVC and permits to save steam to be blown into the packed tower 1. Accordingly, the packed tower 1 according to this invention is advantageous from the energy aspect. In addition, aqueous condensate is recirculated to the packed tower 1, thereby preventing any MVC-saturated waste water from flowing out of the treatment system. Thus, the stripping tower according to this invention is exceptionally suitable for environmental protection.

The present invention will hereinafter be described further by the following Examples. The following Examples are presented to illustrate the present invention, but it is to be understood that the invention is not limited thereto.

In the Examples, the unreacted MVC present in each PVC suspension or emulsion was quantitatively analyzed in the following manner.

Exactly 100 ml of an acetone solution containing 1 wt. % of tertiary butyl catechol (a polymerization inhibitor) was poured into a 300 ml Erlenmeyer flask with ground stopper, followed by a quick addition of 30–50 g of a PVC slurry. The weight of the PVC slurry has been measured accurately in advance. The Erlenmeyer flask containing the slurry sample and acetone solution was then shaken for 1.5 hours to extract MVC into the liquid layer. The MVC contained in the liquid layer was then quantitatively analyzed using a gas chromatograph.

The amount of the resin contained in the PVC slurry was determined on the side. Each quantitative data of MVC was converted to a MVC concentration in the resin.

Although a part of MVC present in the PVC slurry is in fact contained in the water of the slurry, all quantitative data of MVC are converted to MVC concentrations in resins in the present specification.

EXAMPLE 1

A polymerization apparatus was charged with 150 parts by weight of deionized water, 0.03 part by weight of tert-butyl peroxypivalate and 0.1 part by weight of partially saponified polyvinyl alcohol having a saponification degree of 80 mole % and the internal air was then evacuated. Thereafter, 100 parts by weight of MVC were charged and a polymerization reaction was effected at 57° C. The pressure dropped to 5 kg/cm$^2$.G upon an elapsed time of 11 hours. While raising the temperature of the reaction mixture, the recovery of unreacted MVC was started. The recovery was carried out until the gauge pressure reached 0 kg/cm$^2$.G at 75° C. The resultant PVC slurry was transferred to a raw slurry tank. Here, the concentration of MVC remaining in the PVC slurry was 14,000 ppm. This PVC slurry was continuously processed in the apparatus illustrated in FIG. 1 so as to remove MVC from the PVC slurry. Namely, the PVC slurry was drawn out of the raw slurry tank and was then fed via pump. The PVC slurry was preheated to 85° C. in a heat exchanger and thereafter continuously charged at a flow rate of 16 m$^3$/hr through slurry feed nozzle 4 into the packed tower 1 filled with Tellerette packing, each of 2.5 cm diameter, to a volume percentage of 10%. The inner diameter and the height of the packed portion 3 of the packed tower 1 were 1 m and 10 m respectively. Steam was blown into the packed tower 1 through the steam feed nozzle 5 and the temperature of the bottom portion of the packed tower 1 was maintained at 90° C. The interior of the tower 1 was reduced in pressure and the temperature of the top portion of the tower 1 was kept at 88° C. By controlling the pressure at 500 Torr, a boiling state was created in the tower 1. The slurry was brought into countercurrent contact with the steam while operating the packed tower 1 in a gas-in-liquid state with a gas holdup of 0.45 m$^3$/m$^3$. The slurry, which had been stripped in the packed tower 1, was continuously drawn out through the piping 6 provided at the bottom of the packed tower 1 and then cooled. A part of the thus-cooled slurry was recirculated through the piping 7 to the bottom portion of the packed tower 1. A measurement of the concentration of the unreacted MVC remaining in the slurry which had been stripped in the packed tower 1 gave 45 ppm as converted to its concentration per resin. The slurry was dewatered and dried in a manner known per se in the art. A white resin showing no sign of degradation was obtained. In the packed tower 1, the steam charged into the tower 1 reached together with the MVC stripped from the PVC slurry the condenser 2 having an internal diameter of 55 cm. In the condenser 2, the steam was cooled indirectly by cooling water and then recirculated as an aqueous condensate to the interior of the packed tower 1. The thus-separated MVC was discharged from the top portion of the condenser 2 and then fed to the monomer recovery step.

COMPARATIVE EXAMPLE 1

The procedure of Example 1 was repeated except that the condenser 2 of Example 1 was not operated and the gaseous mixture of MVC and steam, which mixture was produced in the packed tower 1, was discharged in its entirety out of the system. Ten minutes later, the top portion of the packed tower 1 was filled up with foams and the operation of the packed tower 1 was no longer possible.

EXAMPLE 2

Subjected to a homogenization treatment in a homogenizer were 100 parts by weight of MVC, 150 parts of deionized water, 0.1 part by weight of sodium lauryl sulfate, 0.2 part by weight of lauryl alcohol and 0.06 part by weight of 2,2'-azobis-2,4-dimethylvaleronitrile. The resultant mixture was charged into a polymerization apparatus. Thereafter, polymerization was allowed to proceed until the internal pressure of the polymerization apparatus reached 4 kg/cm$^2$G at 50° C. Then, 0.1 part by weight of NOPCO FOAMASTER (trade mark; product of Diamond Shamrock Corporation) was added as a defoaming agent and unreacted MVC was recovered until the gauge pressure reached 0 kg/cm$^2$G at the same temperature. A measurement of the concentration of MVC remaining in the resultant PVC latex gave 12,000 ppm. The PVC latex was treated in the same manner as in Example 1, using the same apparatus as that employed in Example 1. The concentration of still-remaining unreacted MVC was 15 ppm based on the resulting PVC resin.

What is claimed is:

1. A monomeric vinyl chloride stripping tower comprising a tower, a packing filling at least part of the internal volume of the tower and having elements designed, dimensioned and arranged to remove monomeric vinyl chloride from a suspension or emulsion of vinyl chloride resin, the tower also having means positioned and arranged for precluding foaming, the foam preclusion means comprising a condenser directly connected to an upper portion of the tower for condensing water and returning the condensed water to the tower, thereby precluding excessive foaming within the tower.

2. A monomeric vinyl chloride stripping tower as claimed in claim 1, wherein the packing is at least one type of packing selected from the group consisting of Raschig rings, Berl saddles, Tellerette packing, pall rings, Lessing rings and interlock saddles.

3. A monomeric vinyl chloride stripping tower as claimed in claim 1, wherein the packing fills 3–50% percent of the internal volume of the packed tower.

* * * * *